United States Patent Office 3,322,654
Patented May 30, 1967

3,322,654
METHOD OF MANUFACTURING TWO - SIDED MOSAIC PLATES FOR CATHODE RAY TUBES
Johannes Josephus Antonius Jonkers and Edward Fokko de Haan, Emmasingel, Eindhoven, Netherlands, assignors to North American Philips Company, Inc., New York, N.Y., a corporation of Delaware
No Drawing. Filed Sept. 11, 1963, Ser. No. 308,054
Claims priority, application Netherlands, Oct. 26, 1962, 284,803
6 Claims. (Cl. 204—12)

ABSTRACT OF THE DISCLOSURE

A method of manufacturing a two-sided mosaic for cathode ray tubes and the like in which an anodized aluminum foil is separated from the underlying oxide and metal layers, and the ducts therein impregnated with a reducible metal salt to render them electrically conductive.

The invention relates to a method of manufacturing a two-sided mosaic plate for cathode ray tubes constituted of aluminum oxide which is provided with electrically conductive ducts extending in the direction of thickness of the mosaic and insulated from one another.

Such a mosaic plate is used in certain types of cathode ray tubes, for example image intensifying tubes, television camera tubes and image storage tubes.

According to a known method such a mosaic plate is manufactured by providing an oxide film on a metal foil, for example an aluminum foil, by anodic oxidation. The film then is coated with an approximately uniformly perforated masking layer, with the aid of which portions of the oxide layer which correspond to the perforations are chemically removed. The resulting perforations of the oxide layer are filled with a second metal and finally the metal foil is removed and, if required, the masking layer. The metal used to fill the perforations may be nickel, which may be deposited electrolytically. This known method is comparatively laborious; furthermore, it does not enable a high resolving power to be obtained. With the aid of these methods mosaic plates having up to 400 ducts per cm. are obtainable. However, it will be appreciated that this would require extremely long treating times for etching the holes in the oxide layer and for the electrodeposition process. In addition, for several uses the said resolving power is not nearly sufficient.

The invention provides a method according to which mosaic plates can be manufactured in a far simpler manner which have a much higher resolving power because they have approximately from 50,000–250,000 conductive ducts per cm. or from $3 \times 10^8$–$10^{11}$ per sq. cm. According to the invention, the conductive ducts are obtained by using the natural pores of aluminum oxide obtained by anodic oxidation.

In the anodic oxidation of aluminum in an electrolyte in which aluminum is moderately soluble, an oxide film is produced which has ducts extending in the direction of thickness of the film which have a diameter of from 100–500 A. and mutual spacings of from 250–1000 A. However, a thin layer of non-porous oxide immediately adjoins the metal. In the method in accordance with the invention, this non-porous oxide layer and the metal layer are removed. The conductive metal is then chemically deposited in the pores of the resulting oxide film, for example by pyrolysis of a compound with which the film has previously been impregnated, for example, a metal carbonyl compound, a noble-metal chloride solution or a sugar solution, or by dialysis of metal sols using the oxide film as the diaphragm. It should be noted that obviously subsequent to the impregnation any excess of compound adhering to the surface or of solution of the compound must be removed before the film is heated to bring about the pyrolysis.

An elegant embodiment of the method in accordance with the invention, in which the non-porous oxide layer and the metal layer can be simply removed mechanically, consists in that the aluminum foil used as the starting material is anodically oxidized first with a solution of an organic carboxylic acid as the electrolyte and immediately thereupon in a solution of sulphuric acid as the electrolyte. The oxide layer produced in the first mentioned electrolyte has a very poor adherence to the second layer which, with the interposition of the thin non porous oxide layer, is adjacent the aluminum so that it may readily be separated from the remainder. A suitable carboxylic acid is, for example, mellitic acid or oxalic acid.

It should be mentioned that this method of obtaining an oxide film which readily becomes detached is known in the investigation of the structure of this aluminum oxide obtained by anodic oxidation. It was not to be foreseen, however, that with the aid of a chemical process the resulting aluminum oxide films could be provided with ducts having sufficient electric conductivity in the direction of thickness, but no conductivity in a direction at right angles thereto, and therefore be suitable for use as two-sided mosaic plates in cathode ray tubes.

An alternative embodiment of the method in accordance with the invention consists in that by anodic oxidation a film of aluminum oxide is produced on an aluminum foil. Thereafter the pores of the aluminum oxide are filled with a substance suspended in a solution but which does not dissolve in the solvent and with the aid of which the aluminum is subsequently removed. The surface of the aluminum oxide initially facing the metal is then pickled until the pores extend right through the film, after which the substance is removed from the pores, for example, with the aid of a solvent.

A very suitable substance for temporarily filling the pores is, for example, nitrocellulose.

Without resorting to this artifice of temporarily filling the pores with a non-reactive substance, it is not possible to produce an aluminum oxide film of the desired structure. The dissolving speed of the thin continuous oxide layer and that of the porous layer differ to such an extent that at the areas at which the continuous layer has been dissolved the porous layer is also entirely dissolved in a very short period of time. By filling the porous layer with an inert substance its dissolving speed is reduced to such extent that it is the same as that of the continuous oxide layer.

Examples (1) A circular plate of aluminum having a purity of 99.98% and a diameter of 65 mm., which was provided with a lug for making an electric contact, was anodically oxidized in a solution of 12 gms. of mellitic acid per liter of deionized water at room temperature.

The voltage of the bath was increased to 40 v. within 1 minute and maintained at this value. The current strength was 21 ma. Anodization was continued for 20 hours, at the end of which period the current strength was 7 ma. The resulting oxide layer had a thickness of 2 microns.

The plate was then washed in distilled water and subsequently again anodically oxidized in a solution containing 55 mls. of $H_2SO_4$ ($d=1.84$) per liter at a voltage of 10 v.

Oxidation was continued until the outer oxide layer became appreciably detached. The plate was taken from the bath, washed with distilled water and arranged in a flat receptacle containing distilled water. By gently agitating the receptacle the oxide film tended to float so that a glass slide could be moved under it so as to break the connection between the film and the plate at the side which initially was the upper edge. The glass slide with the film was washed with ethanol and then dried. The film was readily removed from the slide.

The film was then stuck to a glass ring using a 4% alkaline silicate solution and dried at 100° C. The assembly was suspended in a saturated solution of gold chloride until the film was completely impregnated. The film was then washed with acetone and heated to 400° C. so that the gold chloride was decomposed and metallic gold was deposited in the pores of the film.

The film may alternatively be saturated with a 35% sugar solution instead of with a gold chloride solution. In this event heating to produce carbon deposition in the pores must be carried out in a vacuum.

(2) From aluminum foil having a thickness of $50\mu$ circular plates were cut which had a diameter of 45 mm. and two projecting lugs at their periphery. Such foil of satisfactory quality, i.e. substantially without holes, is commercially available. The plates were selected by examining them when arranged in front of an incandescent lamp; in this manner the smallest holes become visible. The plates which showed the holes were rejected.

The plates were anodically oxidized in an aqueous electrolyte containing 5% of oxalic acid with a voltage between the electrodes of 50 v. and a current density of 1.5 amp./sq. decimeter and at a temperature of from 18 to 20° C. One of the lugs was kept out of the solution and was used as a contact for the passage of current. The other lug was anodized and used to clamp the plates during the subsequent operations. The anodic oxidation was carried out for 40 minutes with the result that an oxide layer from 15–20 microns thick was formed on both sides of the plates.

The anodized plates were then clamped, with the interposition of two rubber rings, between two Perspex rings and immersed for 15 minutes in a solution containing 10% by weight of phosphoric acid and 5% by weight of sodium bichromate and heated to a temperature of 50° C. Subsequently the plates were again oxidized at 20° C. in an electrolyte containing 55 mls. of $H_2SO_4$ ($d=1.84$) in 1 liter of water. The voltage of the bath was raised to 10 v. within 30 seconds. The current strength was initially 120 ma. and increased to 150 ma. (for one plate) in 25 minutes. The current was then switched off. The plates were washed, again clamped between two Perspex rings and arranged horizontally. A zincate solution was poured on the plates within the upper ring so that the oxide layer of the upper surface of the plate was dissolved. This zincate solution was obtained by dissolving 260 gms. of NaOH in 750 mls. of water, dissolving 50 gms. of ZnO in this solution, filtering the resulting solution and adding water to make 1 liter. The zincate solution was removed as soon as the evolved aluminum began to become gray due to the zinc deposited on it. The Perspex rings were removed, the plates were rinsed in running water and suspended in a bath consisting of equal parts by volume of concentrated hydrochloric acid and water in which 3% sodium bichromate and traces of copper chloride had been dissolved.

The films, which were thicker at their periphery, were left in the bath until any gas no longer was evolved, washed and dried first in air and then in a vacuum over phosphorous pentoxide. The porous surfaces of the films were then coated with a dilute solution of nitrocellulose. After drying in air for several hours a protective filling had been deposited in the pores. The films were then immersed for 10 minutes in a solution which contained 10% of phosphoric acid and 5% of sodium bichromate and heated to 40° C.

The films were washed in water and then in acetone, until the nitrocellulose was dissolved. Subsequently they were cemented to glass rings and finally subjected to one of the treatments described in Example 1 to deposit either gold or carbon in the pores.

Two-sided mosaic plate obtained in one of the manners described in the examples for use in one of the above mentioned electronic apparatus were of very high quality.

What is claimed is:

1. A method of manufacturing a two-sided mosaic electrode for an electrical discharge tube comprising the steps of anodically oxidizing an aluminum foil to form a porous aluminum oxide coating thereon, filling the pores of the aluminum oxide with a material which is insoluble in a solvent which dissolves aluminum, dissolving the subjacent aluminum in said solvent, pickling the surface of the aluminum oxide originally adjacent the aluminum metal until the pores extend from one surface to the other, removing said insoluble substance from the pores, and depositing a conductive material in said pores.

2. A method of manufacturing a two-sided mosaic as claimed in claim 1, in which the substance insoluble in the solvent which dissolves aluminum is nitrocellulose which is subsequently dissolved in a solvent to remove it from the pores.

3. A method of manufacturing a two-sided mosaic as claimed in claim 1, in which the conductive material is deposited in the pores by pyrolysis of a metal carbonyl compound.

4. A method of manufacturing a two-sided mosaic as claimed in claim 1, in which the conductive material is deposited in the pores by impregnating the anodically oxidized aluminum with a sugar solution which is heated to decompose the sugar and leave a carbon deposit.

5. A method of manufacturing a two-sided mosaic as claimed in claim 1, in which the conductive material is deposited in the pores by dialysis of a metal employing the anodically oxidized aluminum as a diaphragm.

6. A method of manufacturing a two-sided mosaic as claimed in claim 1, in which the conductive material is deposited in the pores by impregnating the anodically oxidized aluminum with a solution of noble metal chloride solution.

References Cited

UNITED STATES PATENTS

| | | | |
|---|---|---|---|
| 2,380,505 | 7/1945 | De Vore | 204—12 |
| 2,918,416 | 12/1959 | Taylor | 204—58 |
| 3,023,149 | 2/1962 | Zeman | 204—12 |

JOHN H. MACK, *Primary Examiner.*

W. VAN SISE, *Assistant Examiner.*